US006233433B1

(12) United States Patent
Norin

(10) Patent No.: US 6,233,433 B1
(45) Date of Patent: May 15, 2001

(54) APPARATUS AND METHOD OF TESTING MULTI-BEAM SATELLITE REPEATER IN-ORBIT FROM A SINGLE GROUND STATION USING A SAMPLING AND COMBINING MATRIX

(75) Inventor: John L. Norin, Hawthorne, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/244,576

(22) Filed: Feb. 4, 1999

(51) Int. Cl.[7] .................................................. H04B 17/00
(52) U.S. Cl. ..................... 455/67.4; 455/13.3; 455/67.5
(58) Field of Search ................................ 455/67.4, 67.5, 455/67.1, 430, 13.1, 13.3, 12.1, 427, 423, 424; 370/316

(56) References Cited

PUBLICATIONS

Kasstan, Bernard, "In–Orbit Testing of Communications Satellites: An Introduction", *International Journal of Satellite Communications*, Sep.–Oct. 1995, vol. 13, No. 5.

Egly et al., "In–Orbit Test of the First Hughes United States Direct Broadcast Satellite", *International Journal of Satellite Communications*, Sep.–Oct. 1995, vol. 13, No. 5, 301–312.

Kasstan, et al., Recent Advances in "In–Orbit Testing of Communications Satellites", *International Journal of Satellite Communications*, Sep.–Oct. 1995, vol. 13, No. 5, 377–401.

Moens, et al., ESA's In–orbit Test Facilities for Communications Satellites, *International Journal of Satellite Communications*, Sep.–Oct. 1995, vol. 13, No. 5, 403–412.

*Primary Examiner*—William G. Trost
*Assistant Examiner*—Rafael Perez-Gutierrez
(74) *Attorney, Agent, or Firm*—Koppel & Jacobs

(57) ABSTRACT

The new satellite communications repeater test method allows multiple transponders to be tested from a single ground test station. The satellite's receive antenna is aligned with the ground station antenna and uplink test signals are transmitted to the satellite. The uplink test signal is converted to a corresponding downlink signal which is distributed to the transponders fed by the receive antenna. Prior to transmission from the satellite, the amplified downlink signals are sampled and combined and/or switched into a single path having a frequency spectrum which includes the frequency bands of the sampled downlink signals. The combined signal is transmitted to the ground test station from a wide angle transmit antenna. The received downlink signals are measured and stored for later processing to validate the operational characteristics of the transponders. In an alternative embodiment, the sampling and combining matrix includes switches for selecting the sampled signals to be combined.

19 Claims, 5 Drawing Sheets

APPARATUS AND METHOD OF TESTING MULTI-BEAM SATELLITE REPEATER IN-ORBIT FROM A SINGLE GROUND STATION USING A SAMPLING AND COMBINING MATRIX

BACKGROUND OF THE INVENTION

1. Field of the Invention

This invention relates to in-orbit testing of communication satellites, and more particularly to in-orbit repeater testing from a single location on the ground of a satellite that broadcasts multiple downlink beams over a large geographic area.

2. Description of the Related Art

Multi-beam satellites are tested after a successful launch to verify the operation of the receive and transmit antennas and the electronic subsystems. A satellite repeater includes all of the electronics between the receive and the transmit antennas. The transponder includes a receive antenna, the electronics associated with the antenna, and one or more transmit antennas. As shown in FIG. 1, a single ground station 2 transmits an uplink signal 4 that contains broadcast information. A satellite 6 boosts the signal and distributes it to a plurality of narrow-beam transmit antennas that transmit spot beams 8a–8d to different geographic regions 10a–10d. The use of multiple downlink beams having smaller areas of coverage allows the broadcast information to be transmitted to individuals in specific areas, and reusing those same frequencies in other diverse areas.

In-orbit satellite test procedures are described in Egly et al, "In-Orbit Test of the First Hughes United States Direct Broadcast Satellite", *International Journal of Satellite Communications*, Vol. 13, No. 5, September–October 1995, pages 301–312 and in Kasstan et al, "Recent Advances in 'In-Orbit Testing' of Communications Satellites", *International Journal of Satellite Communications*, Vol. 13, No. 5, September–October 1995, pages 377–401. The tests disclosed in the articles do not sample the amplified downlink signal prior to transmission from the satellite.

A network of ground test stations are distributed throughout the different geographic regions 10a–10d to receive the downlink signals and verify operation of the satellite subsystems. A test signal is transmitted from ground station 2, amplified, and rebroadcast in downlink beams (8a–8d), which are sampled within their respective areas of coverage (10a–10d). In the example shown in FIG. 1, four test stations, one within each downlink beam, are required to receive downlink signals corresponding to the uplink test signal. Usually the ground test stations are portable so that the downlink signal can be measured from multiple points within the area of coverage. The power tests are conducted from a location within the downlink beam where the power level of the downlink signal is at or near maximum. The measured data is then combined with characteristics of the test signal and processed to verify operation.

A major disadvantage of the test method just described, is that the test is repeated at multiple ground test stations. As the number of channels increases, so does the number of tests which must be performed. Increasing the number of tests performed increases the time and cost of verifying the operation of the satellite.

SUMMARY OF THE INVENTION

The present invention provides a fast, low-cost apparatus and method for performing in-orbit repeater tests after launch. Positioning the satellite so that a receive antenna is aligned with the ground test station antenna provides the necessary link for testing the repeater. An uplink test signal is generated and transmitted from the single ground test station. The uplink test signal is converted to a downlink signal, amplified, and distributed to the transmit antennas fed by the receive antenna.

A directional coupler preceding each transmit antenna samples the downlink signal and a matrix of signal combiners and/or switches that selectively routes the sampled outputs to a single test amplifier. At one extreme, an extensive switch network routes each output test sample to the test amplifier. In the other extreme, a passive unswitched network of combiners combines all of the sampled outputs into a single output that is fed to the test amplifier. The amplified signal is transmitted from a wide angle transmit antenna to the single ground test station. The wide angle transmit antenna allows transmission of the downlink signal regardless of the position of the satellite. The test procedure is repeated for each receive antenna, with the received downlink signals being used to verify the operation of the satellite's repeater.

A disadvantage of previous methods of testing in-orbit satellites, is time and cost. Multiple downlink test sites are required to receive and analyze the multiple downlink signals. As the number of transmit antennas being fed by a receive antenna increased, so does the number of test sites required to verify operation. The new test method overcomes this disadvantage by providing a method of testing multiple receive antennas and their corresponding transponders from a single ground test station.

Another advantage of the new method of testing an inorbit satellite is its use of existing satellite hardware. The only additional hardware required are directional couplers for sampling the downlink signals, a matrix of signal combiners and/or switches to provide a single combined downlink test signal, and a wide angle coverage transmit antenna.

These and further features and advantages of the invention will be apparent to those skilled in the art from the following detained description, taken together with the accompanying drawings, which are not to scale.

DETAILED DESCRIPTION OF THE INVENTION

The present invention provides an apparatus and method for testing the repeater of an in-orbit satellite. The new approach allows in-orbit testing of multiple transponders to be performed from a single ground test station, which reduces the time and cost of performing the tests.

Figure 1:
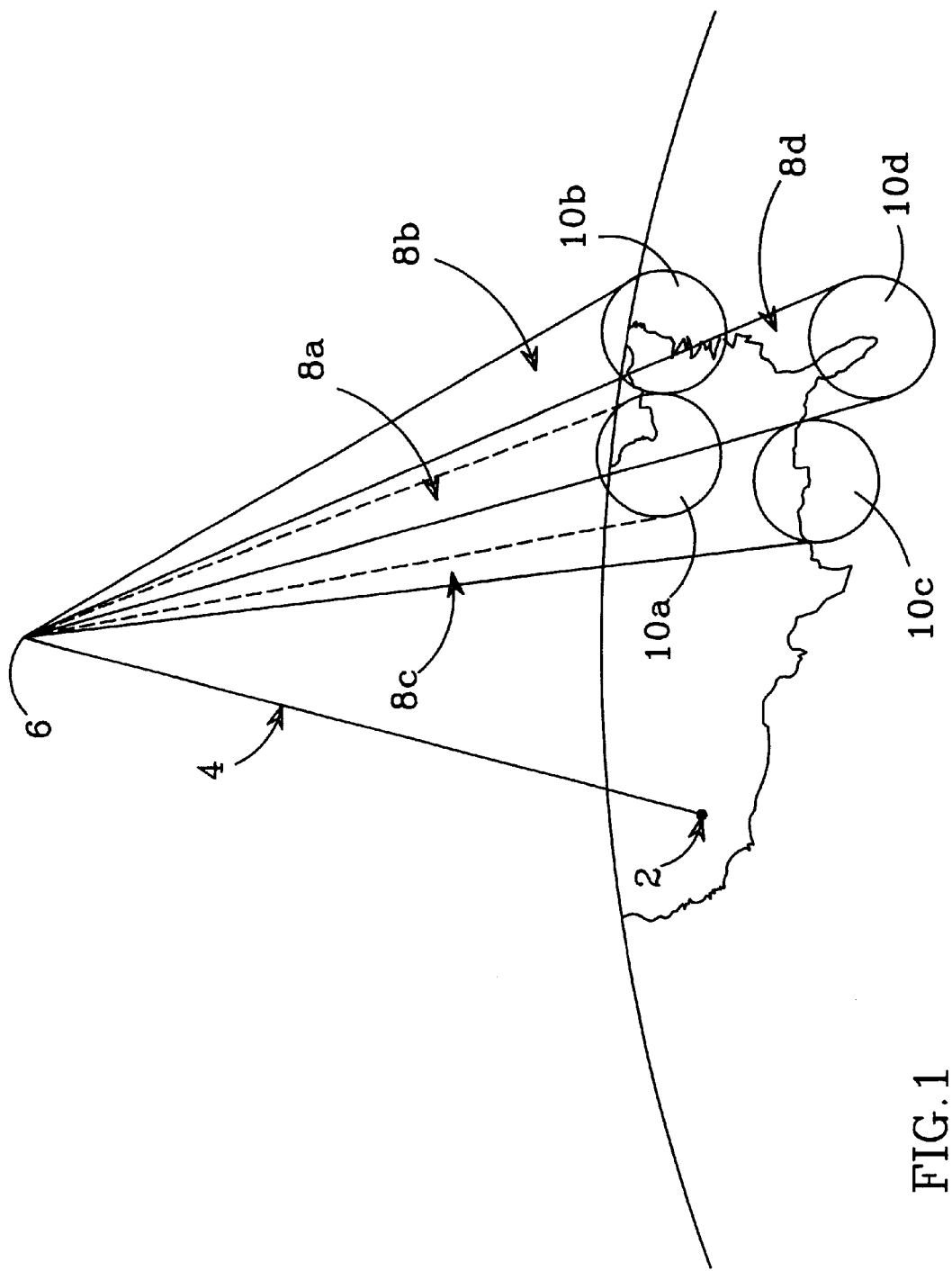
FIG. 1, as described above, illustrates a multi-beam satellite in-orbit.
Figure 2:
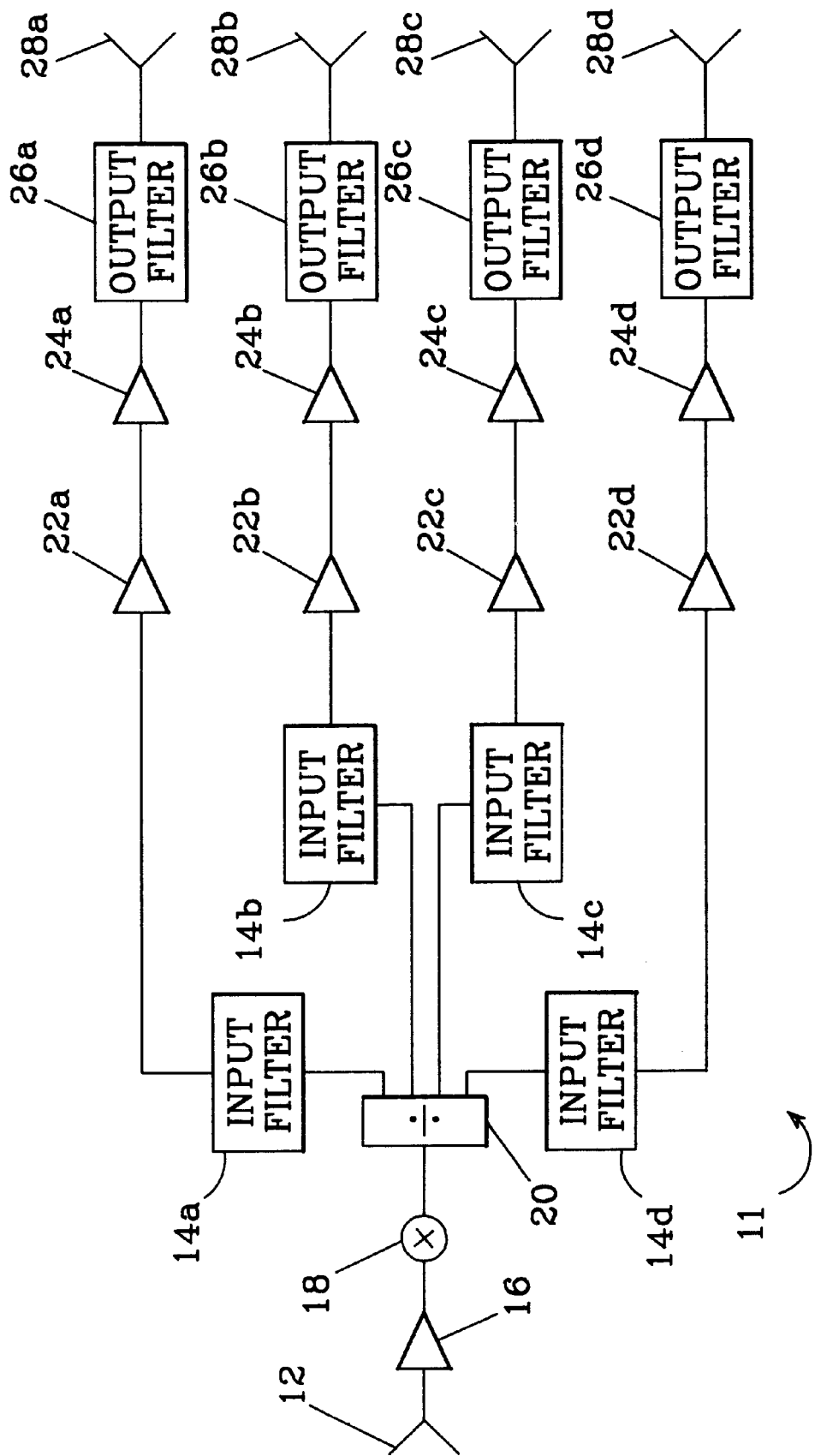
FIG. 2 is a schematic diagram of a multi-beam satellite repeater in accordance with the invention.

A schematic diagram of a satellite repeater 11 in which a receive antenna 12 receives an uplink signal and feeds four transmit antennas 28a–28d is shown in FIG. 2. An amplifier 16 and a mixer 18 remove noise and convert the uplink signal to a corresponding downlink signal. A divider network 20 distributes the downlink signals. Input channel filters 14a–14d remove signals outside the desired frequency range. Channel amplifiers 22a–22d increase the gain of the respective signals. After the downlink signals are amplified by high power amplifiers 24a–24d, output filters 26a–26d remove frequencies outside the desired channel band and the signals are transmitted from transmit antennas 28a–28d in respective downlink beams.

Figure 3:
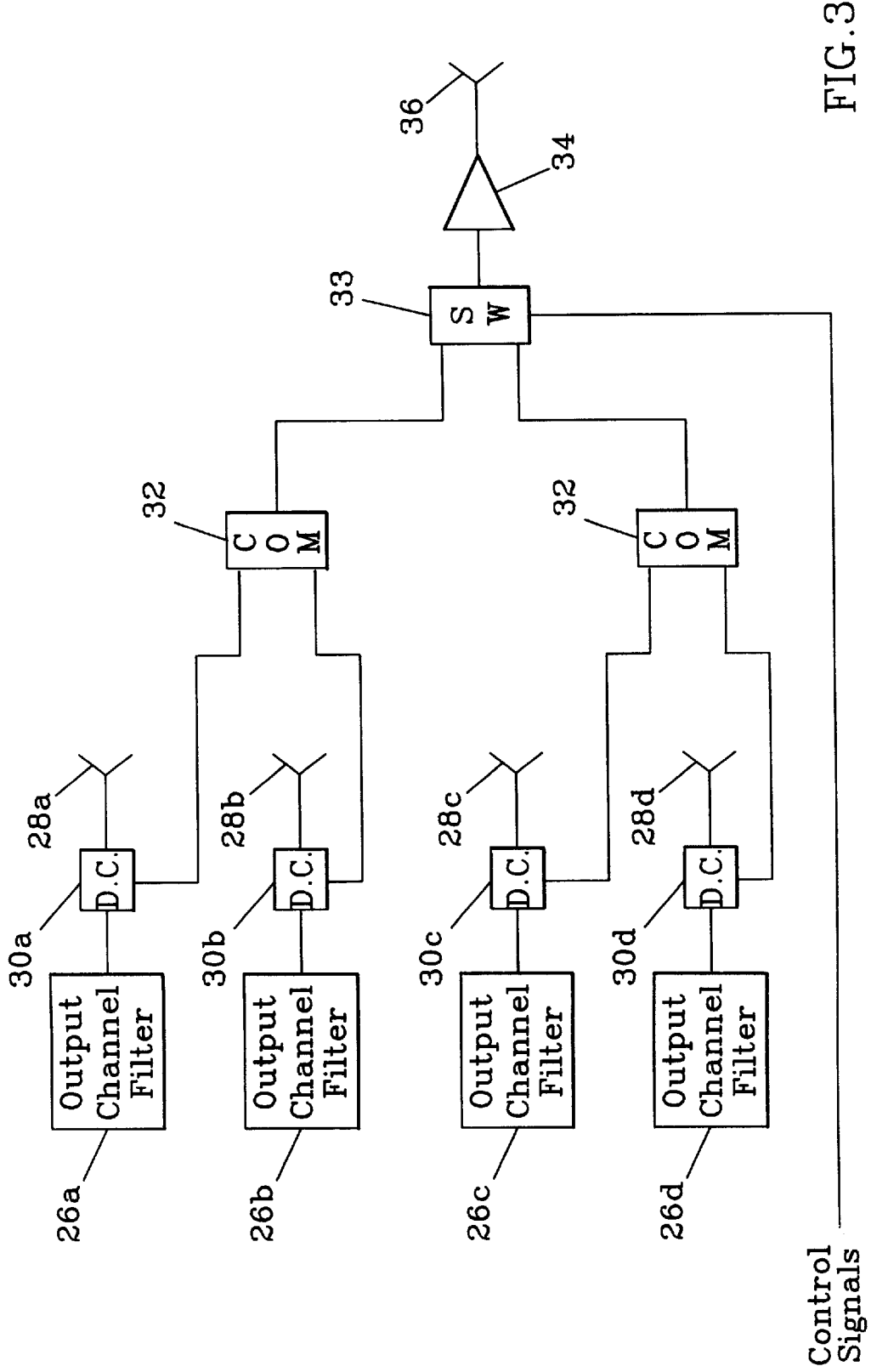
FIG. 3 is a schematic diagram of a of an onboard repeater test circuit.

FIG. 3 is a schematic diagram illustrating the additional sampling, combining, and switching circuitry that is integrated with the existing hardware. The circuitry includes a plurality of directional couplers 30a–30d that are connected between each high power amplifier and the transmit antenna it feeds. A directional coupler is a waveguide component which has spaced slots separating two parallel waveguides and is common in the industry. As the downlink signal passes through the directional coupler, a portion, or sample, of the signal passes through the slots into the parallel port. The directional coupler provides a sample of the downlink signal at a level compatible with the allowable insertion loss imparted on the main signal while maintaining sufficient sampled power.

A matrix of signal combiners 32 and/or switches 33 selectively routes the sampled outputs from a plurality of transponders to a single spare power amplifier 34. At one extreme, the matrix comprises only switches 33 such that each sampled output is applied to the amplifier 34 independent of the other samples. This provides processing flexibility, but increases cost, complexity, weight and the test duration. At the other extreme, all of the sampled outputs are routed through a passive, unswitched matrix of signal combiners 33 that produces a single combined signal that is applied to the amplifier 34. Although similar, this approach may suffer from increased noise levels and signal multipath.

In the preferred embodiment shown, the signal combiners 32 group some of the output signals together and switches 33 selectively route the different combined signals to the power amplifier 34. As the number of transmit antennas increases, the number of combiner/switch stages will also increase. The driving line between combiners 32 and switches 33 will depend upon the characteristics of a particular embodiment. The mixed architecture can be optimized for cost or performance.

Waveguide combiners 32 are junctions at which two or more waveguide sections terminate into a combined section. The combined section has a large enough bandwidth to pass signals within the frequency band of the transmit circuits feeding into it. The multiple signals are combined into a single device having a frequency spectrum which includes the frequency bands and energy of the combined signals.

Attenuators are placed within the combining matrix to balance the sampled signals relative to each other. Waveguide attenuators built into the waveguides attenuate the signal by absorption and reflection so that the power level of the multiple sampled signals is approximately the same.

The signal level entering the spare amplifier 34 is adjusted so that it is operating in a linear region during the test. By operating the spare amplifier 34 in the linear region, the test circuitry does not effect the characteristics of the sampled signal. The attenuation level may be adjusted prior to launch or may be adjustable by transmitting commands from a ground test station to the satellite's telemetry circuitry.

Switches 33 are typically multi-state microwave switches such as the well known R or T-switch configurations. A T-switch has four microwave paths which are selectively interconnected. There are three different states, in which opposing pairs of the microwave paths are switched to a signal connecting position to couple two pairs of ports while the remaining paths are switched to a signal-attenuating position. Two ports can be used as input ports which are then selectively switched to interconnect with either port three or port four, one of which feeds the next stage in the matrix. The microwave switches 33 must be controlled to route the output samples to the amplifier 34. To actuate the switches, commands are transmitted from the ground test station to the satellite's telemetry circuitry via a telemetry antenna on the satellite.

Figure 4:
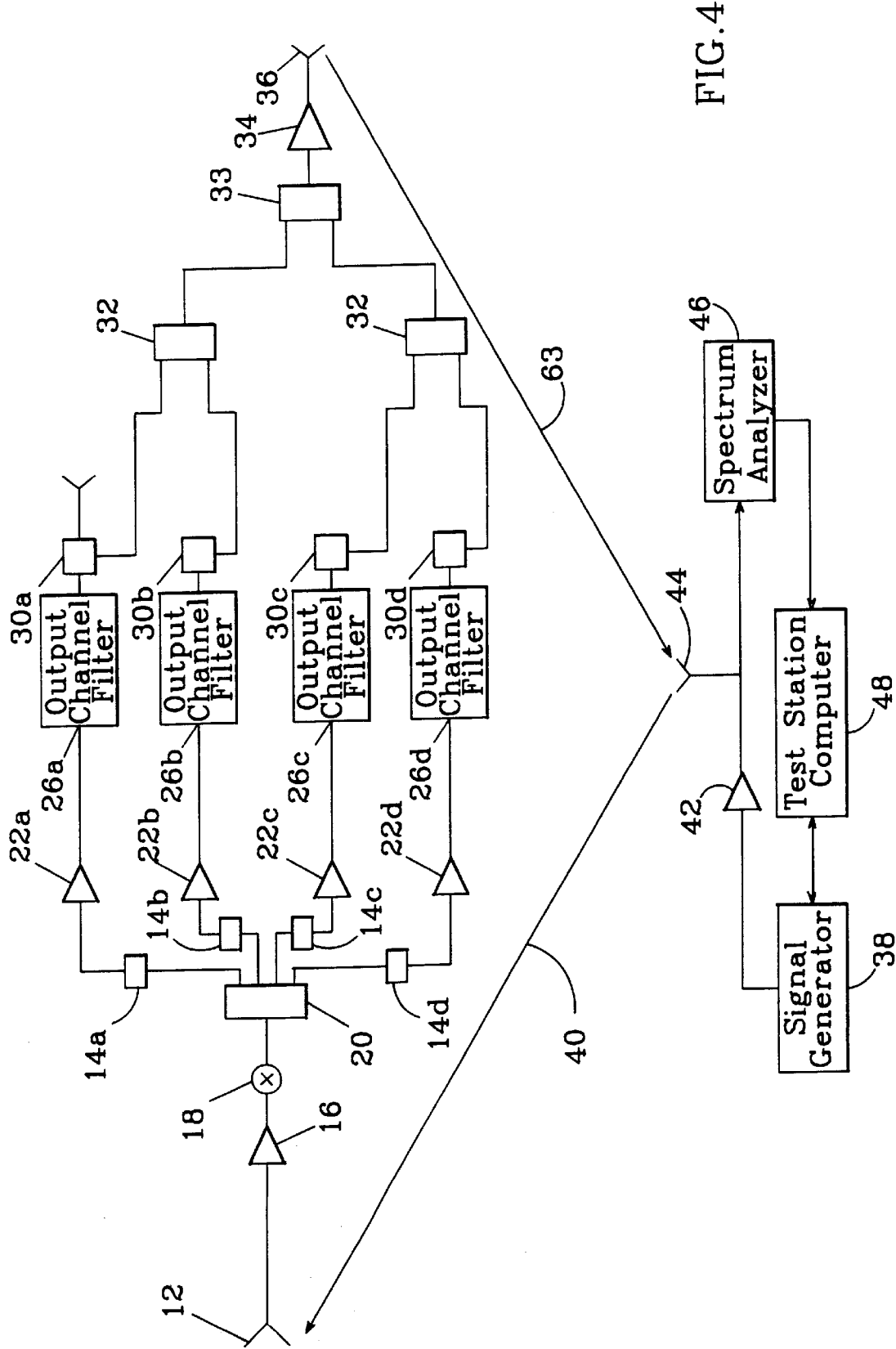
FIG. 4 is a sample satellite test configuration in accordance with the invention.

A sample communications satellite test configuration is shown in FIG. 4. The single ground test station includes a signal generator 38 for generating uplink test signals, a high power amplifier 42 for increasing the power of the uplink signals prior to transmission, and a test antenna 44 which transmits test signals 40 and receives corresponding downlink signals. The ground station also includes a spectrum analyzer 46 that measures the received signal and a test station computer 48 to record data corresponding to the downlink signals 163.

Figure 5:
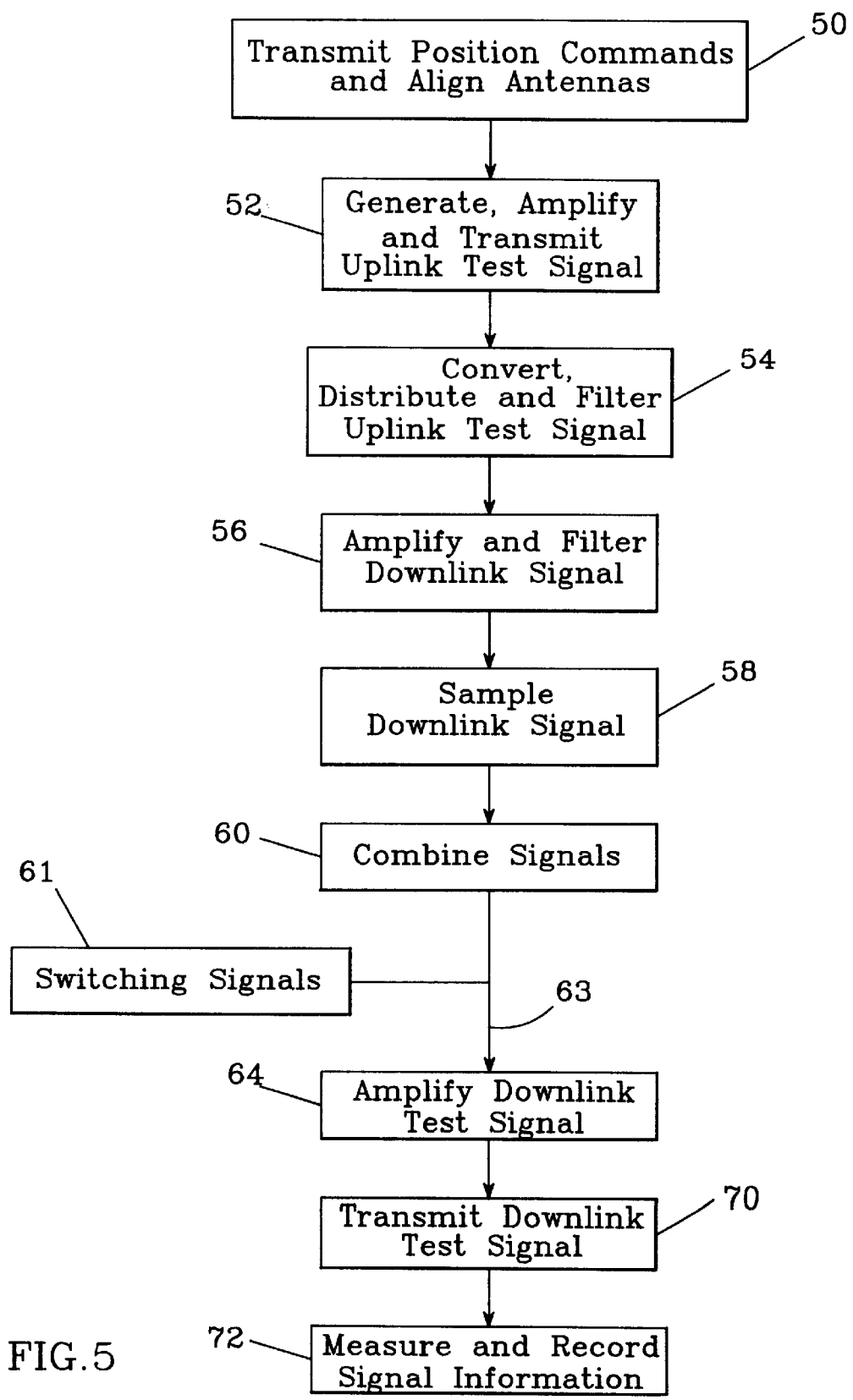
FIG. 5 is a flow diagram of the repeater test method for the sample test configuration of FIG. 3.

A flow diagram of the new method of testing satellite transponders after launch from a single ground test station is shown in FIG. 5 for the test configuration of FIG. 4. Commands are transmitted from the test station directing the satellite to change its position (step 50) so that the receive antenna 12 feeding the transponder under test, is aligned with the ground test antenna 44. Uplink test signals 40 within the frequency band of the receive antenna 12 are generated, amplified, and transmitted (step 52). The received uplink test signals are converted to corresponding downlink signals by mixer 18, and distributed by divider network 20 through input channel filters 14a–14d to their respective multiple channel amplifiers 22a–22d, four in this example (step 54). After the downlink signals have been amplified by channel amplifiers 22a–22d and filtered by output channel filters 26a–26d for transmission (step 56) from transmit antennas 28a–28d, they are routed through directional couplers 30a–30d where the signals are sampled (step 58).

The sampled signals are combined by signal combiners (step 60) to produce a subset of combined signals. As shown, combiners 32 produce two different signals. Alternatively, all of the signals could be combined into one signal or the step could be skipped entirely. As shown, switch 33 switches between the two combined signals (step 61) to drive the amplifier 34 (step 62). Alternatively, each of the sampled outputs can be switched through to the amplifier independently or the step skipped altogether. The frequency spectrum of the combined downlink signal 63 includes the frequency bands of the sampled signals. The combined signal is amplified by a spare amplifier (step 64) and transmitted from a wide angle transmit antenna (step 70).

The downlink signal 63 received by the ground test antenna 44 is measured by test equipment 46 such as a spectrum analyzer, frequency counter, group delay analyzer, power meter, or other measurement device, and information relating to the signal is recorded by the test station computer 48 for later processing (step 72). Downlink signals from different channels have different frequency bands. Information, such as power level, is recorded for signals within each downlink band. The information extracted from the returned downlink signal may be used to verify the operation of each channel after launch.

Using the new test method just described, an in-orbit communications satellite repeater can be tested from a single ground test station. Prior tests required an uplink signal to be transmitted from multiple uplink sites and downlink signals were received at test stations within each downlink beam. By sampling and combining multiple downlink signals prior to transmission, and transmitting the combined downlink signal from a wide angle transmit antenna, all of the channels fed by the receive antenna can be tested from a single test station. After testing the transponders fed by the receive antenna, commands are transmitted directing another receive antenna to be aligned with the test station antenna.

By aligning each receive antenna with the test station antenna and transmitting a combined downlink signal from the broad range transmit antenna, the entire satellite repeater can be tested from a single ground test station. Using the new test method reduces the time and cost of performing in-orbit repeater tests without significantly increasing the weight of the satellite.

An advantage of using a switching matrix is that it reduces the possibility of adding unwanted noise to the combined signal. It also provides a method of testing individual channels. The disadvantage of using a switching matrix is increase in cost and time required to complete the repeater tests.

The sample test configuration shown in FIG. 4 is illustrated for the purpose of explaining the method of testing a multi-beam satellite from a single ground test station. Although the sampling and combining matrix was described using directional couplers and microwave combiners or a series of switches, alternative hardware, such as a combination of combiners and microwave switches, could be used. Alternative embodiments will occur to those skilled in the art. Such variations and alternatives are contemplated, and can be made without departing from the spirit and scope of the invention defined in the appended claims.

I claim:

1. A method of testing a multi-beam satellite from a single ground test station, comprising the steps of:
   transmitting position commands to said satellite from said ground test station,
   aligning a receive antenna on said satellite in accordance with said position commands,
   transmitting a test signal to said receive antenna on said satellite from said ground test station,
   converting said test signal to a plurality of downlink signals onboard said satellite,
   sampling said downlink signals between respective power amplifiers and transmit antennas using respective directional couplers;
   routing said sampled downlink signals into a single downlink test signal at the input of a test amplifier,
   amplifying said single downlink test signal by said test amplifier,
   transmitting said amplified downlink test signal from said satellite to said ground test station, and
   using said received combined signal to verify the operation of said satellite.

2. The test method of claim 1, wherein said routing includes combining said plurality of sampled downlink signals to produce a single downlink test signal having a frequency spectrum including the frequency bands of said combined downlink signals.

3. The test method of claim 1, wherein said routing further includes: combining less than all of said plurality of sampled downlink signals to produce a subset of said downlink test signals, and selectively switching said subset to said test amplifier.

4. The test method of claim 1, wherein said routing includes selectively switching a single sampled downlink signal to said test amplifier comprising: transmitting a switch position command to said satellite from said ground test station, and actuating at least one signal switch in accordance with said switch position command.

5. The test method of claim 1, further including measuring a characteristic of said received combined signal at said ground test station, storing said measured characteristic, and using said measured characteristic to verify the operation of said satellite.

6. The test method of claim 5, wherein said received combined signal characteristic is measured by a frequency counter.

7. The test method of claim 5, wherein said received combined signal characteristic is measured by a group delay analyzer.

8. The test method of claim 5, wherein said received combined signal characteristic is measured by a power meter.

9. The test method of claim 5, wherein said received combined signal characteristic is measured by a spectrum analyzer.

10. An apparatus for performing an in-orbit satellite repeater test from a single ground test station, comprising:
    a satellite comprising: a receive antenna for receiving a test signal from said single ground test station, a mixer to convert said test signal to a plurality of downlink signals, and a plurality of amplifiers that amplify said downlink signals,
    a plurality of directional couplers that sample said amplified downlink signals,
    a plurality of transmit antennas connected to transmit respective sampled amplified downlink signals,
    a signal matrix that routes said sampled downlink signals to produce a single downlink test signal,
    a test amplifier that increases the power of said downlink test signal, and
    a test transmit antenna that transmits said amplified downlink test signal.

11. The apparatus of claim 10, wherein said signal matrix includes a plurality of signal combiners that combine said sampled downlink signals to produce a single downlink test signal.

12. The apparatus of claim 10, wherein said signal matrix includes a respective plurality of switches that selectively route said sampled downlink signals to said test amplifier.

13. The apparatus of claim 10, wherein said signal matrix includes a combination of signal combiners and switches that selectively route less than all of said downlink signals to said test amplifier.

14. A method of testing a multi-beam satellite from a single ground test station, comprising the steps of:
    transmitting an uplink test signal to a receive antenna on said satellite from said ground test station,
    generating and sampling a plurality of downlink signals corresponding to said received uplink test signal;
    routing said sampled downlink signals to produce a single downlink test signal,
    amplifying said single downlink test signal by an amplifier onboard said satellite,
    transmitting said downlink test signal from said satellite to said ground test station, and
    using said transmitted downlink test signal to verify the operation of said satellite.

15. The test method of claim 14, further including transmitting position commands to said satellite from said ground test station and positioning said satellite in accordance with said position commands so that said receive antenna is aligned with said ground test station.

16. The test method of claim 14, wherein said routing includes combining said plurality of sampled downlink signals to produce a single downlink test signal having a frequency spectrum which includes the frequency bands of said combined downlink signals.

17. The test method of claim 14, wherein said routing further includes combining less than all of said plurality of sampled downlink signals to produce a subset of said downlink test signal, and selectively amplifying said subset to said amplifier.

18. The test method of claim 14, wherein said routing includes selectively switching a single sampled downlink signal to said amplifier.

19. The test method of claim 18, wherein said selectively switching includes transmitting a switch position command to said satellite from said ground test station, and actuating at least one signal switch in accordance with said switch position command.

* * * * *